(12) United States Patent
Schwendinger et al.

(10) Patent No.: US 7,662,507 B2
(45) Date of Patent: Feb. 16, 2010

(54) HVAC CONTROLLER BATTERY TRAY

(75) Inventors: Paul G. Schwendinger, St. Louis Park, MN (US); Tim M. Redmann, Carver, MN (US)

(73) Assignee: Honeywell International Inc., Morristown, NJ (US)

( * ) Notice: Subject to any disclaimer, the term of this patent is extended or adjusted under 35 U.S.C. 154(b) by 908 days.

(21) Appl. No.: 10/878,772

(22) Filed: Jun. 28, 2004

(65) Prior Publication Data

US 2005/0287424 A1    Dec. 29, 2005

(51) Int. Cl.
     *H01M 2/10*    (2006.01)
     *H01M 2/26*    (2006.01)
     *H01M 6/42*    (2006.01)
     *H01M 2/02*    (2006.01)
     *H01M 2/08*    (2006.01)
     *B65D 45/16*    (2006.01)

(52) U.S. Cl. .................. 429/96; 429/100; 429/97; 429/121; 429/159; 429/163; 429/164; 429/170; 220/324

(58) Field of Classification Search .................. 429/96, 429/97, 100, 164, 170; 220/324
See application file for complete search history.

(56) References Cited

U.S. PATENT DOCUMENTS

| | | | |
|---|---|---|---|
| 2,789,160 A | 4/1957 | Gage | |
| 4,152,551 A | 5/1979 | Hiller | |
| 4,391,883 A | 7/1983 | Williamson et al. | |
| 4,641,370 A | 2/1987 | Oyamada | |
| 4,904,549 A | 2/1990 | Goodwin et al. | |
| 4,959,640 A | 9/1990 | Hall | |
| 4,972,508 A | 11/1990 | King | |
| 4,991,225 A | 2/1991 | Holcomb et al. | |
| 5,039,580 A * | 8/1991 | Mori et al. | 429/97 |
| 5,188,912 A * | 2/1993 | Katoh et al. | 429/96 |
| 5,193,051 A | 3/1993 | Ma | |
| 5,198,638 A | 3/1993 | Massacesi | |
| 5,244,755 A | 9/1993 | Benoist et al. | |
| 5,280,273 A | 1/1994 | Goldstein | |
| 5,281,954 A | 1/1994 | Harrison et al. | |
| 5,843,595 A * | 12/1998 | Kawakatsu | 429/97 |
| 6,428,924 B1 | 8/2002 | Suganuma et al. | |
| 6,636,018 B2 | 10/2003 | Hirota | |
| 2002/0160255 A1 | 10/2002 | Babcock et al. | |
| 2004/0048638 A1 | 3/2004 | Inomata et al. | |
| 2004/0196621 A1* | 10/2004 | Nakamura | 361/679 |

OTHER PUBLICATIONS

Jess Stein, The Random House College Dictionary 1980, Random House Inc., Revise Edition; p. 117.*
Bose Wave, Setting up the remote control, 1 page, prior to filing date of present application.

* cited by examiner

*Primary Examiner*—Patrick Ryan
*Assistant Examiner*—Helen O Chu (57) ABSTRACT

An HVAC controller includes a controller housing having an aperture and a battery tray removably disposed within the aperture. The battery tray can include an outer wall and a beam element fixed relative to the outer wall and extending away from the outer wall. The beam element can have a free end and an end element disposed on or adjacent to the free end.

10 Claims, 5 Drawing Sheets

HVAC CONTROLLER BATTERY TRAY

BACKGROUND

HVAC controllers are used widely in dwellings, buildings, and other controlled spaces. In many cases, the HVAC controllers are mounted on a wall or the like to allow for the measurement and control of the temperature, humidity and/or other environmental parameter within the space. HVAC controllers come in a variety of shapes and with a variety of functions. Advanced HVAC controllers have built in electronics, often with solid state sensors, to sense and control various environmental parameters within a space. The user interface of some electronic HVAC controllers includes software controlled buttons and a display.

HVAC controllers often utilize a battery power source as a main power source and/or back-up power source. As a back-up power source, batteries are effective to retain the programmed parameters in the event that the normal power source in the controller circuit is removed or becomes ineffective. In some controllers, both such features are provided by a battery (or several batteries) mounted within the controller. A battery also enables maintaining real time in the event of a power interruption.

A battery, however, has certain disadvantages. For example, it requires mounting space, sometimes a significant amount, within the controller. Also, the battery should be replaced periodically. Such replacement is an inconvenience to the user as it often requires dismantling at least a portion of the controller and proper replacement and re-assembly.

SUMMARY

The present invention relates generally to an improved HVAC controller that has a battery tray. In one illustrative embodiment, an HVAC controller includes a controller housing having an aperture and a battery tray removably disposed within the aperture. The battery tray can include an outer support wall and a beam element fixed relative to the outer wall and extending away from the outer wall. The beam element can have a free end and an end element disposed on or adjacent to the free end.

The battery tray can allow a user to simply remove the battery tray from the HVAC controller housing and place or replace a battery in the battery tray. The user can then place the battery and associated battery tray back into the controller housing aperture. The battery tray can be utilized in any type of HVAC controller, as desired.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

Figure 1:
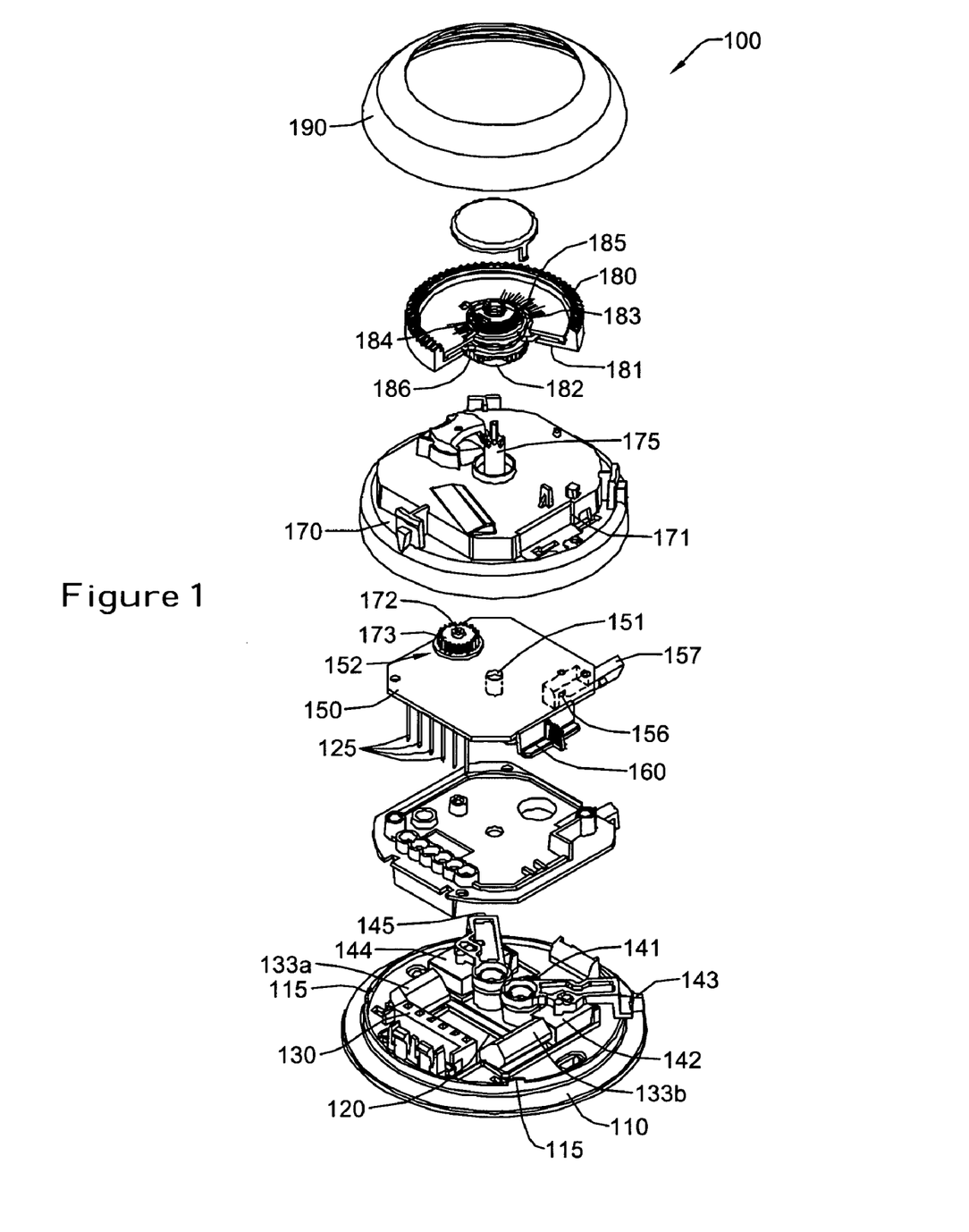
FIG. 1 is a perspective exploded view of an illustrative HVAC controller.

The battery tray described herein is useful in any type of HVAC controller. FIG. 1 shows one embodiment of an HVAC controller incorporating an illustrative battery tray. However, it is contemplated that the battery tray can be incorporated into any type, style, or shape of HVAC controller, as desired.

FIG. 1 is a perspective exploded view of an illustrative controller 100, which in the embodiment shown, includes a base plate 110 which is configured to be mounted on a wall by any suitable fastening means such as, for example, screws, nails, adhesive, etc. The illustrative base plate 110 has a circular shape, however the base plate 110 can have any shape, as desired. In an illustrative embodiment, the base plate has a diameter in the range of 8 cm to 12 cm.

The base plate 110 can include a printed circuit board 120. In the embodiment shown, the printed circuit board 120 is affixed to the base plate 110 on the opposite side shown. One or more wires may be used to interconnect a remote HVAC system (e.g. furnace, boiler, air conditioner, humidifier, etc.) to the base plate 110 at terminal blocks 133a and 133b.

In this illustrative embodiment, a variety of switches are disposed on the base plate 110 and in electrical connection with the printed circuit board 120. A fuel switch 141 is shown located near the center of the base plate 110. The fuel switch 141 can switch between E (electrical) and F (fuel). A FAN ON/AUTOMATIC switch 142 and corresponding lever 143 is shown disposed on the base plate 110. The FAN ON/AUTOMATIC switch 142 can be electrically coupled to the printed circuit board 120. A COOL/OFF/HEAT switch 144 and corresponding lever 145 is shown disposed on the base plate 110. The COOL/OFF/HEAT switch 145 can be electrically coupled to the printed circuit board 120.

The printed circuit board 120 can be electrically coupled to a second printed circuit board 150 by a plurality of pins 125 that are fixed relative to the second printed circuit board 150. The plurality of pins 125 may extend through a PCB shield before sliding into a connector 130 on the first printed circuit board 120.

The second printed circuit board 150 can be disposed adjacent to the base plate 110 as shown. In the illustrative embodiment shown, a potentiometer 152 is disposed on (the opposite side shown) and electrically coupled to the second printed circuit board 150. While a potentiometer 152 is shown, it is contemplated that any mechanical to electrical translator may be used. In the illustrative embodiment, the potentiometer 152 is positioned at or near a center of the second printed circuit board 150, but this is not required. In the illustrative embodiment, the potentiometer 152 is coupled to a controller (not shown) on the second printed circuit board 150, which provides one or more control signals to a remote HVAC system.

A temperature sensor, or in the illustrative embodiment, a thermistor (not shown) is disposed on and electrically coupled to the second printed circuit board 150. In one embodiment, the temperature sensor or thermistor can be located near an edge of the second printed circuit board 150, however it is contemplated that the thermistor can be located at any position on or near the second printed circuit board 150, or elsewhere, as desired.

A light source 156 is also shown disposed on and electrically coupled to the second printed circuit board 150. The light source can be, for example, an LED. In the illustrative embodiment, the light source 156 is shown positioned adjacent to a light guide 157. The light guide 157 is shown extending away from the second printed circuit board 150, and may extend through an intermediate housing 170 for viewing by a user of the thermostat, if desired.

A battery tray 160 is shown disposed on the second printed circuit board 150. The battery tray 160 holds a battery. The battery is electrically coupled to the second printed circuit board 150. In some embodiments, the battery tray 160 can extend through and form at least part of the intermediate housing 170. In the illustrative embodiment, the battery tray 160 is removable by a user as further described below.

The intermediate housing 170 is shown disposed over the second printed circuit board 150 and base plate 110. In the illustrative embodiment, the intermediate housing 170 includes one or more support members 175 that are laterally offset from a center of the intermediate housing 170, and extending up and away from the intermediate housing 170. In one illustrative embodiment, the center of the intermediate housing 170 is disposed along a rotation axis of a rotatable selector 180. The intermediate housing can further include a housing aperture 171 sized to fit the battery tray 160.

A potentiometer shaft 172 can extend from the potentiometer 152 and through the intermediate housing 170. In one embodiment, the potentiometer shaft 172 is rotatable, and is laterally offset from the support member 175. In this illustrative embodiment, the potentiometer shaft 172 is coupled to a circular gear 173 disposed about the potentiometer shaft 172. While a circular gear 173 is shown, it is contemplated that the any suitable gear may be used including, for example, a sector gear, a screw type gear or any other type of gear, or drive mechanism, as desired. A rotatable selector 180 is shown disposed about the support member 175.

The illustrative rotatable selector 180 is shown having a circular annular shape. However, this is not required. For example, the rotatable selector 180 may have a circular semi-annular shape, a square shape, a hexagonal shape or any other suitable shape, as desired. The rotatable selector 180 can include a planar portion 181 and a sleeve 182 disposed on the planar portion 181 that extends away form the planar portion 181. The sleeve 182 is located at or near a center or centroid of the rotatable selector 180, but this is not required. A circular gear 186 is shown disposed about and fixed relative to the sleeve 182. The circular gear 186 can be configured to engage the potentiometer circular gear 173 so that the potentiometer gear 173 moves as the rotatable selector gear 186 moves. The sleeve 182 may be disposed about the support member 175 to allow for rotational movement of the rotatable selector 180 about the support member 175.

A scale plate 183 can be disposed adjacent the planar portion 181 and fixed to the support member 175. The scale plate 183 can include indicia such as, for example, temperature indicia for both a current temperature and a set point temperature. A current temperature indicator 184 can be fixed to the scale plate 183 and may be formed of a bimetal coil, if desired. A set point temperature indicator 185 can be fixed to the planar portion 181. Thus, in this illustrative embodiment, the rotatable selector 180 and set point temperature indicator 185 rotate relative to the scale plate 183 and the current temperature indicator 184. In some embodiments, a display (e.g. LCD), one or more buttons, indicator lights, noise making devices, logos, and/or other devices and/or components may be fixed to the support member 175, if desired, wherein the rotatable selector 180 may rotate relative to these other devices and/or components. FIG. 1 also shows an outer housing 190 fixed relative to the intermediate housing 170. The illustrative embodiment shows the outer housing 190 having an annular shape, however the outer cover 190 can have any suitable shape, as desired.

Figure 2:
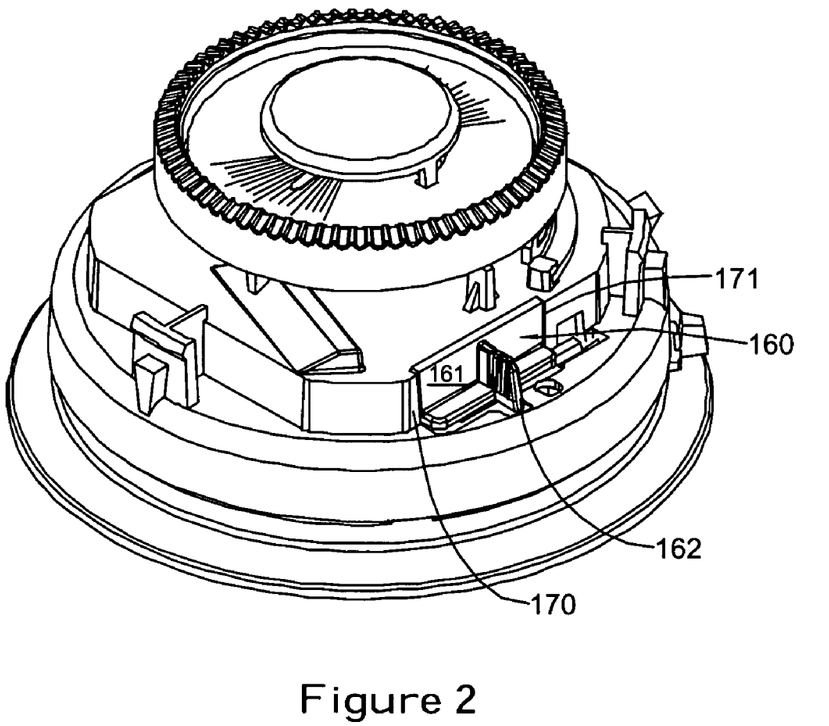
FIG. 2 is a perspective view of the illustrative HVAC controller of FIG. 1 with the outer cover removed.

FIG. 2 is a perspective view of the illustrative HVAC controller 100 with the annular cover 190 removed. In this illustrative embodiment, the battery tray 160 is disposed within the housing aperture 171 and can be partially or fully removed from the intermediate housing aperture 171. The battery tray 160 can include an outer support wall 161. In some embodiments, the outer support wall 161 forms an integral surface with the controller housing 170. In some embodiments, the battery tray 160 can include a gripping means 162 such as, for example, a handle, a tab, flange, lip, or the like, disposed on the outer support wall 161, however this is not required. A user can grasp the battery tray 160 and fully or partially remove the battery tray 160 from the intermediate housing aperture 171 and place a battery in the battery tray 160 or replace an existing battery in the battery tray 160. The battery tray 160 can then be re-positioned within the intermediate housing aperture 171, as desired.

Figure 3:
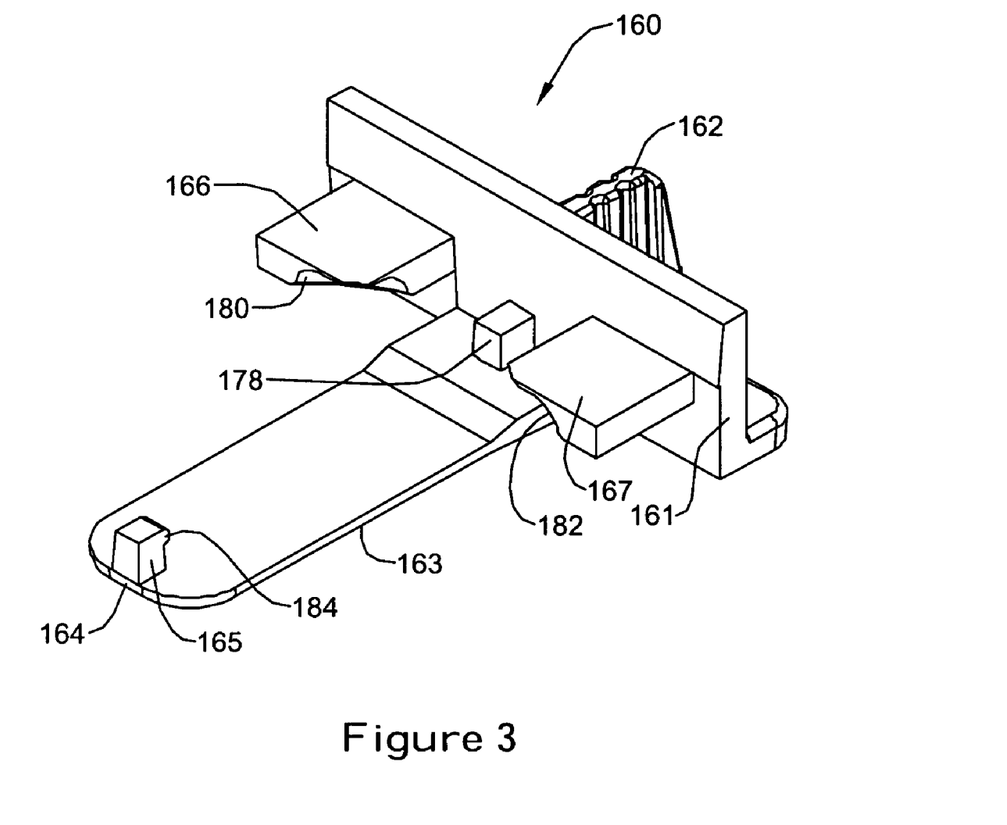
FIG. 3 is a perspective view of an illustrative battery tray.

FIG. 3 is a perspective view of an illustrative battery tray 160 fully removed from the intermediate housing aperture 171. In this embodiment the battery tray 160 includes an outer support wall 161 and a beam element 163 fixed to the outer support wall 161 and extending away from the outer support wall 161 to a beam free end 164. In some embodiments, gripping means 162 as described above can be fixed to the outer support wall 161, as desired. The outer support wall 161 can have any useful dimensions such as, for example, a length in a range of 1 to 4 cm, a width in a range of 0.5 to 2 cm, and a thickness in a range of 0.05 to 0.2 cm, but other dimensions can be used, as desired.

In some embodiments, the beam 163 extends orthogonally away from the outer support wall 161. The beam 163 can have any useful dimensions such as, for example, a length in a range of 1 to 5 cm, a width in a range of 0.1 to 1 cm, and a thickness in a range of 0.05 to 0.2 cm, but other dimensions can be used, as desired.

A free end element 165 is shown fixed to the beam free end 164. The free end element 165 can extend orthogonally away from the beam free end 164. The free end element 165 can be any useful size for retaining a battery in the battery tray 160, such as, for example, a length in a range of 0.1 to 0.5 cm, a width in a range of 0.1 to 0.5 cm, and a thickness in a range of 0.1 to 0.5 cm, but other dimensions can be used, as desired. In some embodiments, the free end element 165 may include a nub 184 for engaging a side surface of a battery.

The illustrative battery tray 160 can also include one or more side arms fixed to the outer support wall 161. A first side arm 166 and a second side arm 167 are shown fixed to the outer support wall 161 and extending away from the outer support wall 161. The first side arm 166 and a second side arm 167 can extend parallel with and in the same direction as the beam 163. In some embodiments, the beam 163 is at least partially disposed between the first side arm 166 and a second side arm 167. In some embodiments, the beam 163 can be fixed to and extend from the outer support wall 161 at a lower portion of the outer support wall 161 and the side arms 166, 167 can be fixed to an extend from the outer support wall 161 at a middle or upper portion of the outer support wall 161; the battery can then be positioned at least partially between the beam 163 and the side arms 166, 167.

In some embodiments, each side arm 166 and 167 may include a recess 180 and 182, respectively, for receiving a portion of the battery. When a coin cell type battery is used, the recesses 180 and 182 may be adapted to accept the round outer circumference of the battery, and in some cases, also engage a side surface of the battery, as shown.

In some embodiments, a support member 178 may also be provided. The support member 178 may extend out from the outer support wall 161 between side arms 166, 167 and along at least part of the beam 163. The support member 178 may provide added rigidity to the beam 163, as desired.

Figure 4:
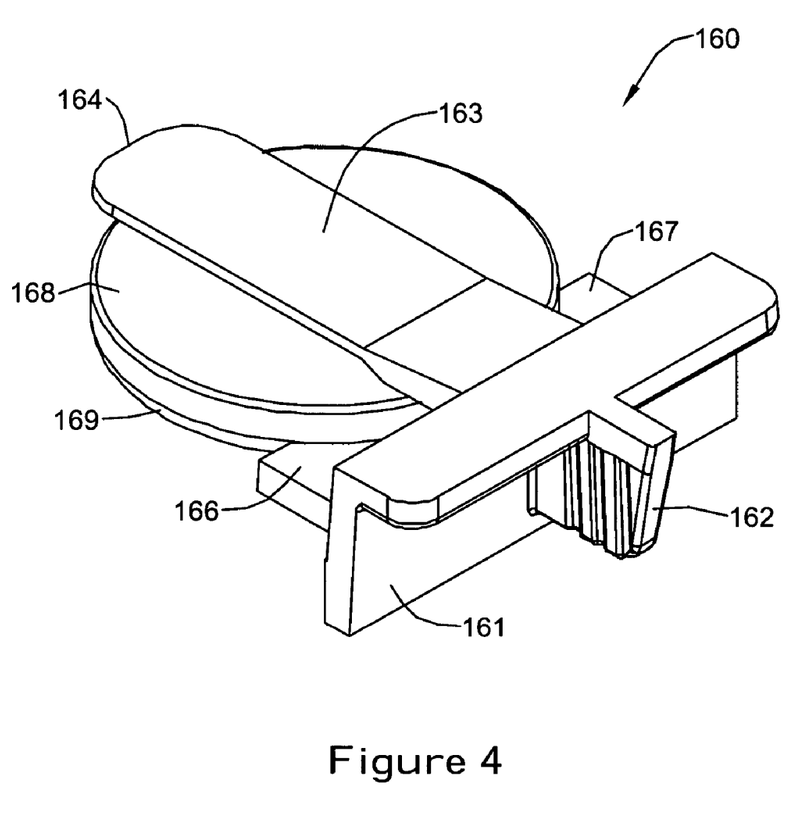
FIG. 4 is a perspective view of an illustrative battery tray and associated battery.

FIG. 4 is a perspective view of an illustrative battery tray 160 and an associated battery 168. The battery tray 160 can be sized to accept any size battery, such as a coin cell type battery 168. The illustrative battery tray shown in FIG. 4 is also described above with reference to FIG. 3. The battery 168 is shown engaged within the battery tray 160. The battery 168 includes an outer circumference surface 169. The battery 168 can be electrically coupled to the circuit board 150 disposed within the housing 170.

The beam 163 can extend across the coin cell battery 168 with the free end element 165 contacting the outer circumference surface 169 at one or more points. In some cases, the nub 184 (see FIG. 3) can engage a side surface (opposite side that is shown) of the battery 168. Likewise, and when provided, the recesses 180 and 182 of the side arms 166, 167, respectively, may accept the round outer circumference of the battery, and in some cases, engage the side surface (opposite side that is shown) of the battery 168. At least part of the beam 163 may engage the other side surface (the side that is shown) of the battery 168, but this is not required. In some cases, the outer circumference surface 169 may include both planar and tapered surfaces shown defining the outer circumference of the battery 168.

As noted above, the first side arm 166 and the second side arm 167 can be adapted to contact the outer circumference surface 169 at one or more points. In one embodiment, the free end element 165 contacts only the outer circumference surface 169 at one point. In another embodiment, the free end element 165 contacts the outer circumference surface 169 at one point and the first side arm 166 and second side arm 167 each contact the outer circumference surface 169 at one point. In another embodiment, the outer circumference surface 169 of the battery 168 is contacted by the battery tray 160 by four or more contact points.

Figure 5:
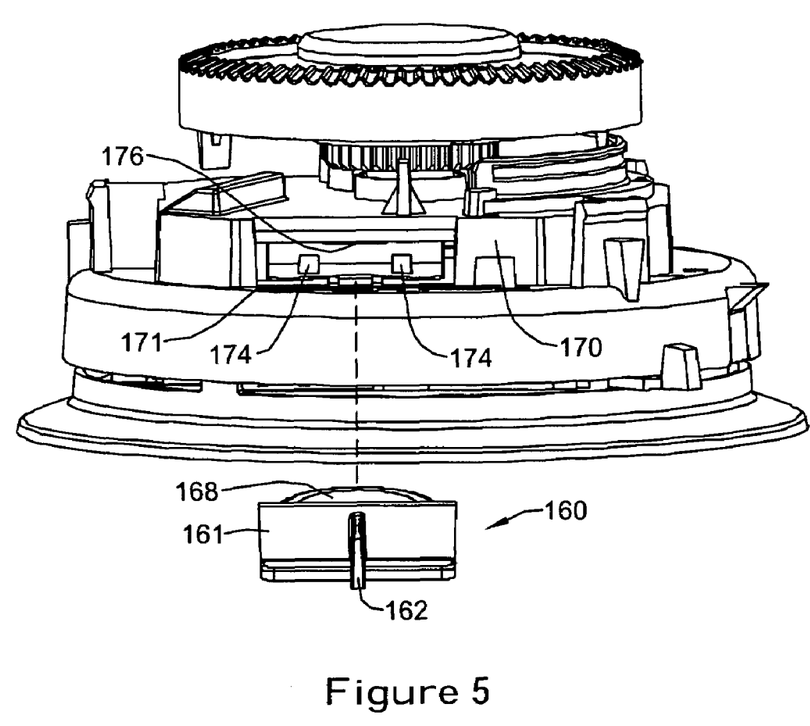
FIG. 5 is a perspective view of illustrative HVAC controller of FIG. 2 with the battery tray and associated battery removed.

FIG. 5 is a perspective view of illustrative HVAC controller of FIG. 2 with the battery tray 160 and associated battery 168 removed. In one embodiment, one or more lower battery contacts or tabs 174 are disposed within the intermediate housing aperture 171, and one more upper battery contacts or tabs 176 are disposed within the intermediate housing aperture 171. The upper and lower battery contacts or tabs 176, 174 are electrically coupled to the printed circuit board 150 and/or other electrical components within the HVAC controller 100.

In one embodiment, the lower battery contacts or tabs 174 are the "positive" or (+) contacts and the upper battery contacts or tabs 176 are the "negative" or (−) contacts. In another embodiment, the upper battery contacts or tabs 176 are the "positive" or (+) contacts and the lower battery contacts or tabs 174 are the "negative" or (−) contacts. In some embodiments, the upper contacts or tabs 176 and lower contacts or tabs 174 are positioned within the intermediate housing aperture 171 such that, when the battery 168 and battery tray 160 are placed within the intermediate housing aperture 171, the upper contacts or tabs 176 contact one side of the battery 168 and the lower contacts or tabs 174 contact an opposing side of the battery 168.

In the embodiment shown, the lower contacts or tabs 174 are spaced apart from one another such that the battery tray 160 beam 163 can be disposed between the two lower contacts or tabs 174. In some embodiments, the lower contacts or tabs 174 have a resistant bias and apply force onto the battery 168 placed within the intermediate housing aperture 171. This applied force can help maintain the battery 168 contact with the upper contact or tab 176. In the embodiment shown, the lower contacts or tabs 174 are fixed to the printed circuit board 150 at one end and free at an opposing end.

In the embodiment shown, the upper contact or tab 176 is a single circular contact of similar size to the size of the battery 168 side surface in contact with the upper contact or tab 176. However, it is contemplated that the upper contact or tab 176 can be any size and/or assume any configuration, as desired. In addition, the upper contact or tab 176 may include more than one contact or tab, if desired.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes may be made in details, particularly in matters of shape, size and arrangement of parts without exceeding the scope of the invention.

What is claimed is:

1. An HVAC controller for controlling one or more HVAC components of an HVAC system, the HVAC controller comprising:
   a controller housing having an aperture;
   a controller situated in the controller housing for controlling one or more HVAC components of an HVAC system;
   a battery tray slideably disposed within the aperture, the battery tray configured to receive a battery having first and second planar surfaces and an outer peripheral edge surface extending around the battery between the first and second planar surface, the battery tray comprises an outer wall and a beam element fixed relative to the outer wall and extending away from the outer wall, the beam element having a free end and an end element, with the end element disposed on or adjacent to the free end of the beam element, wherein the beam element is configured to extend across the battery when the battery is inserted into the battery tray with a first portion of the outer peripheral edge surface of the battery facing the outer wall and a second opposite portion of the outer peripheral edge surface of the battery facing away from the outer wall, the end element is configured to engage at least part of the second opposite portion of the outer peripheral edge surface of the battery; and
   the battery tray further having a first side arm and a second side arm fixed relative to the outer wall, extending away from the outer wall, and spaced from one another, with each of the first and second side arms configured to engage at least part of the first portion of the outer peripheral edge surface of the battery.

2. An HVAC controller according to claim 1 further comprising a coin cell battery disposed within the battery tray, the coin cell battery having an outer circumference edge surface that corresponds to the outer peripheral edge surface.

3. An HVAC controller according to claim 1 wherein at least a portion of the outer wall forms part of the surface of the controller housing.

4. An HVAC controller according to claim 2 wherein the end element contacts the outer circumference edge surface of the coin cell battery.

5. An HVAC controller according to claim 2 wherein the end element contacts only the outer circumference edge surface and not the first and second planar surfaces.

6. An HVAC controller according to claim 1 wherein the beam element is positioned between the first and second side arms and offset in a vertical direction therefrom.

7. An HVAC controller according to claim 1 wherein the controller housing further comprises a removable outer housing and the battery tray is covered by the removable outer housing.

8. An HVAC controller according to claim 1 wherein when the battery is inserted into the battery tray, the beam element extends along the first planar surface and the one or more side arms extend toward the second planar surface of the battery.

9. An HVAC controller for controlling one or more HVAC components of an HVAC system, the HVAC controller comprising:
   a controller housing having an aperture;
   a controller situated in the controller housing for controlling one or more HVAC components of an HVAC system;
   a battery tray slideably disposed within the aperture, the battery tray configured to receive a coin cell battery having a width and a thickness, with first and second planar surfaces substantially defining the width and an outer peripheral edge surface extending around the coin cell battery between the first and second planar surface substantially defining the thickness;
   the battery tray comprising:
   an outer wall and a beam element fixed relative to the outer wall and extending away from the outer wall, the beam element having a width and a free end, with an end element disposed on or adjacent to the free end of the beam element, wherein the beam element is configured to extend across a circumference of the coin cell battery with the end element engaging at least part of the outer peripheral edge surface of the battery;
   the width of the beam element is sized to be less than the width of the coin cell battery such that the at least part of the first and second planar surfaces extends beyond the width of the beam element in both lateral directions when the battery is inserted into the battery tray; and
   the battery tray further having a first side arm and a second side arm fixed relative to the outer wall and extending away from the outer wall, the first side arm and the second side arm spaced from one another and positioned adjacent either side of the beam element, and configured to engage corresponding parts of the outer peripheral edge surface of the battery.

10. The HVAC controller of claim 9 further comprising:
   a plurality of battery contacts disposed within the aperture, at least two of the plurality of battery contacts configured to contact the first planar surface of the battery on opposing sides of the beam element.

\* \* \* \* \*

UNITED STATES PATENT AND TRADEMARK OFFICE
CERTIFICATE OF CORRECTION

| | | |
|---|---|---|
| PATENT NO. | : 7,662,507 B2 | Page 1 of 1 |
| APPLICATION NO. | : 10/878772 | |
| DATED | : February 16, 2010 | |
| INVENTOR(S) | : Schwendinger et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1252 days.

Signed and Sealed this

Thirtieth Day of November, 2010

David J. Kappos
*Director of the United States Patent and Trademark Office*